Figure 1:
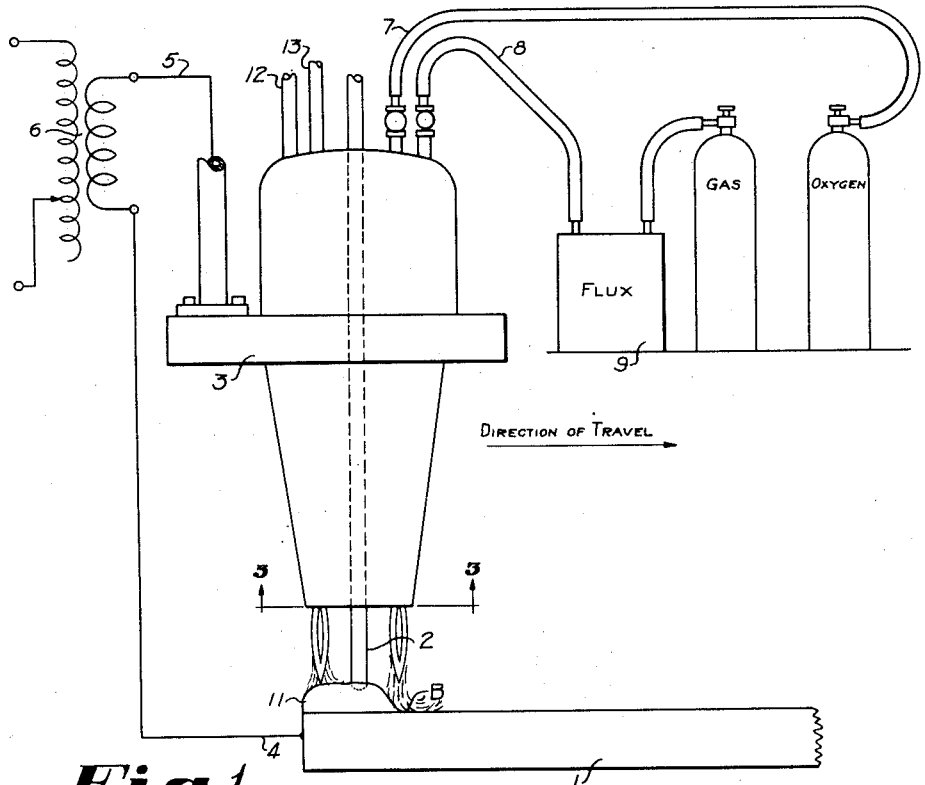

March 24, 1942.  M. MERLUB-SOBEL ET AL  2,277,654
METALLIC BONDING PROCESS
Original Filed Sept. 3, 1938   2 Sheets-Sheet 1

INVENTORS.
MENAHEM MERLUB-SOBEL
CHARLES A. MEDSKER
BY
ATTORNEYS.

Patented Mar. 24, 1942

2,277,654

UNITED STATES PATENT OFFICE 2,277,654

METALLIC BONDING PROCESS

Menahem Merlub-Sobel and Charles A. Medsker, Cleveland Heights, Ohio, assignors to William L. Ulmer.

Continuation of application Serial No. 228,368, September 3, 1938. This application May 2, 1940, Serial No. 332,985

3 Claims. (Cl. 29—189)

The present invention relates to a novel and improved method of obtaining a strong and efficient bond between two metallic substances, such as in the coating or cladding of steel with non-ferrous metals. It is the general object and nature of our invention to provide such a metallic bonding process which is economical in operation, produces a strong and tenacious bond between the metals, is capable of producing any desired thickness of the applied metal, and is further capable of applying a layer of coating metal to both sides of a backing metal in the form of a plate, slab, or strip.

Our invention possesses the advantage of eliminating the heretofore required preliminary step of chemically cleaning the surface of the metal such as by treatment in a gaseous reducing atmosphere, elimination of the step of preapplication of flux or fluxing agent, elimination of the other surface treatments such as scarifying, milling or abrading, and finally, the elimination of the application of pressure such as in percussion welding, foraging or similar processes dependent upon the exertion of the pressure in order to produce intimate contact between the bonded metals.

Our invention produces a true molecular or cohesive bond between the metals as distinguished from a mere surface to surface or "adhesive" bond heretofore obtained in some prior art processes relying upon thermal factors of treatment only. In other words, our invention provides an intermediate cementing, bonding or cohesive layer, which in the case of metals which are miscible in the solid state with each other, will be composed of an alloy or intermetallic compound of the two; and in the case of immiscible metals, there will occur a bonding layer in the form of a positive mechanical bond between the grains or particles of the two metals. Our invention also prevents the deterioration of alloys or mixtures of metals, such as in the case of the "burning out" of lower melting point constituents (e. g., zinc in brass).

It is basic knowledge to those skilled in the art of bonding metals, that the temperature of the two metals when placed in contact must be at or near the melting point of one of the metals (viz., the lower melting point metal), that the contacting surface or bonding line of the metals must be chemically and physically cleaned (viz., free from dirt and oxides), and finally, especially in the case of metals which do not have a relatively great affinity for each other, some exterior force or action must be employed to compress, agitate, or otherwise force the molecules of the metals into intimate intermetallic contact. According to the principle of our invention, all three of these factors or conditions are obtained in a novel, simple, and efficient manner. Briefly outlined, our invention generally comprises two steps; first, the preheating of the applied metal or lower melting point metal to a temperature approximating its melting point, for the purpose of placing it in a fluid or plastic state; and secondly, the simultaneous additional heating of the applied metal to above the melting point and localized, or "surface-zone" heating of the backing metal; fluxing to obtain a chemically clean surface to surface contact with agitation or "puddling" to remove impurities from the melted metal, and to effect intimate intermetallic contact of the metals at their bonding line.

To the accomplishment of the foregoing and related ends, said invention, then, consists of the steps hereinafter fully described and particularly pointed out in the claims.

The annexed drawings and the following description set forth in detail one approved method of carrying out the invention, such disclosed method, however, constituting but one of the various ways in which the principle of the invention may be used.

Figure 2:
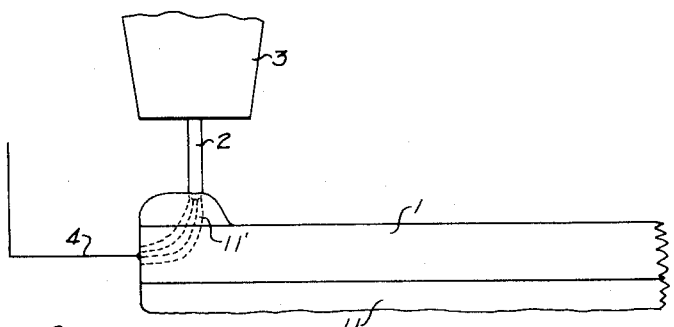
Figure 3:
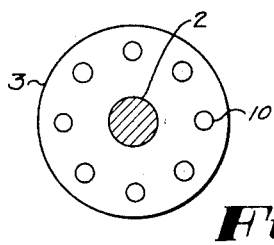
Figure 4:
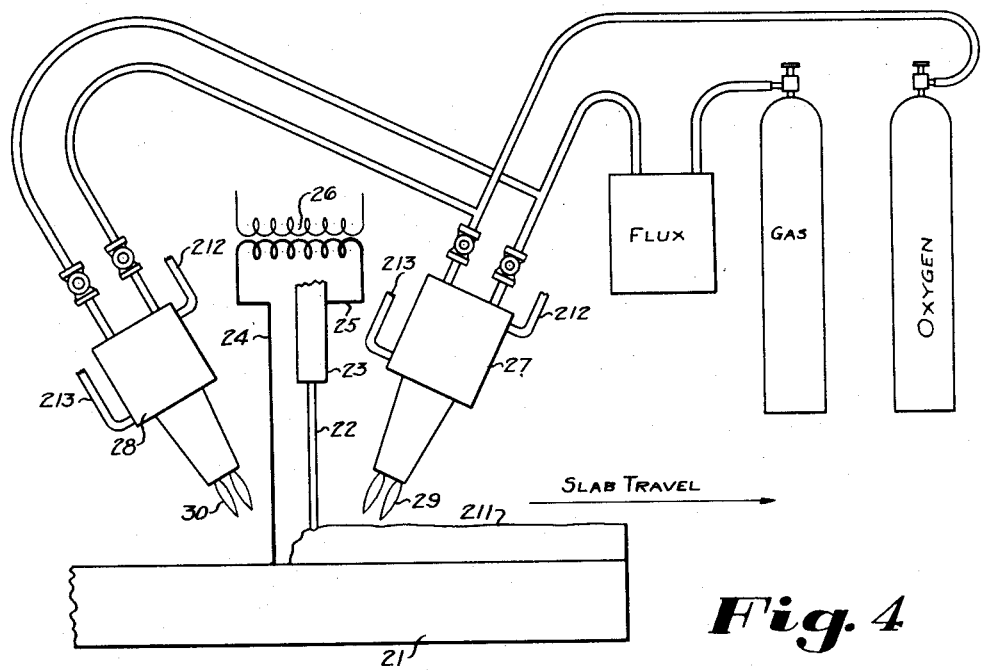
Figure 5:
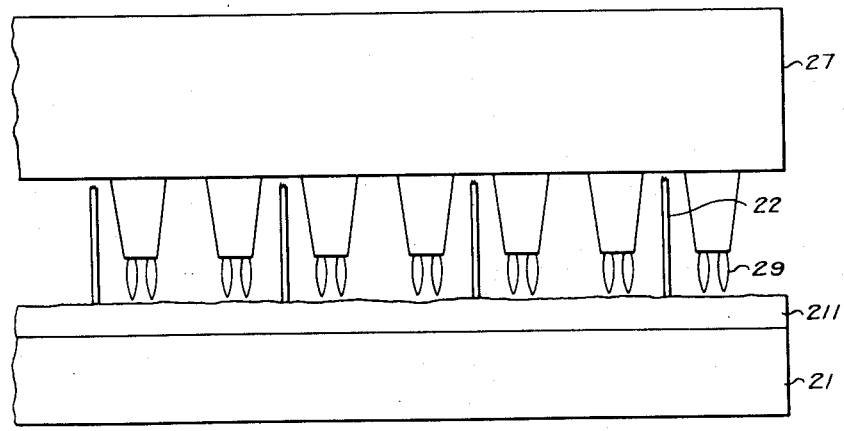

In said annexed drawings:

Fig. 1 illustrates in a more or less diagrammatic form the apparatus required for performing the process embodying the principle of our invention; and Fig. 2 is a view illustrating the application of our invention to the coating or cladding of both sides of a plat plate, slab, or strip; Fig. 3 is a view of the bottom end of the traveling head and taken substantially along line 3—3 and in the direction of the arrows in Fig. 1; Fig. 4 illustrates in a more or less diagrammatic form a modified form of apparatus; and Fig. 5 is a view taken upon a plane normal to that of Fig. 4.

Now referring more particularly to the drawings and describing our process in greater detail, one of the metals such as steel, is preferably in the form of a plate, slab, or strip 1.

The applied metal which in the present illustration is in the form of a rod 2, passes down through the center of a traveling head 3 which is supported upon a suitable carriage (not shown). The applied metal and the metal to which it applied, or the backing metal, are thus moved relatively to each other. Alternatively, the backing strip 1 may be moved and the head

3 held stationary. The backing strip 1 and head 3 are connected by means of the wires 4 and 5 to a source of electric energy, such as across the output of the electric transformer 6. Sufficient power or wattage is passed through the rod 2 to heat it to a temperature at least approaching its melting point. Oxygen is introdduced through the conduit 7 to the head 3 where it is admixed with flux entraining combustible gas entering the head 3 through the conduit 8. Such mixture of the oxygen and the gas in the head 3 is not further illustrated or explained in detail for the reason that it is accomplished in the well known manner customarily employed in gas torch heads. The flux is entrained in the combustible gas by means of bubbling or passing the latter through a chamber 9 containing a so-called "vapor-phase" liquid flux, such as methyl or ethyl borate solution, such as embodied in the co-pending application, Serial No. 329,494, filed April 13, 1940, by Jerome M. Bialosky and Menahem Merlub-Sobel; or a volatile halide flux as embodied in another co-pending application, Serial No. 335,406 filed May 15, 1940, by the same joint applicants.

A flame produced by the oxygen and combustible gas issues from the orifices 10 surrounding the metal rod 2. The heat of such flame is sufficient to raise the temperature of the applied metal to above its melting point, if necessary, and is of sufficient force or pressure to effect an agitation or "puddling" action of the applied metal. Moreover, the flame, or at least portions thereof, as clearly shown in Fig. 1, carries the entrained flux onto the area B which is immediately in advance of the point of application of the molten metal, to thereby clean and protect such surfaces. In other words, the applied metal covers each increment of the cleaned surface after such increment has been cleaned. The solvent action of the gas entrained flux removes oxides and other foreign substances and impurities, not only from the area B, but also maintains the layer 11 of the applied metal free of occluded gases, impurities and blow holes. The gas entrained flux also possesses the property of producing a "wetting action" between the two metals, thus aiding in the intermetallic contact and promoting the cementing together or bonding of the metals.

The method which has been described accordingly is a method of cladding metals which consists in providing a backing metal and a metal to be applied thereto, providing a combustible gas flame having a vaporized flux entrained therein, directing said flame and flux against the surface of the backing metal while moving said flame and backing metal relatively to each other, whereby to progressively clean by increments substantially the entire surface of said backing metal of all impurities which would interfere with the creation of a sound bond between the backing and applied metals, and flowing said metal to be applied onto said backing metal in such manner as to cause said applied metal to cover each increment of said cleaned surface after such increment has been cleaned.

In some instances it will be found desirable to preheat the backing metal before the application and heating of the applied metal. Such preheating can be accomplished by means of furnace heating, blow pipe heating, electric induction heating or carbon arc heating. The necessity for such preheating of the backing metal is of course determined by the size and properties of the metal and the speed of production desired.

It should also be obvious that the applied metal can be in other forms than that of the rod 2, such as in rectangular cross-sectional or "ribbon" form, without violating the spirit of the invention.

When it is desired to clad or bond both sides of the backing strip 1, the latter is reversed or turned upside down from the position as shown in Fig. 1, and the cycle of operations repeated to apply the metal in the layer 11'. The layer 11 will not be melted from the underside of the backing strip 1 due to the fact that the heating zone is localized on the opposite side of the backing strip 1. We are at present unable to ascribe any scientific principle or theory for the reason why the heating zone is thus localized on the opposite side of the backing strip 1, but it is possible that, as indicated by the dotted lines in Fig. 2, the lines of travel of the electric current pass upwardly and away from the applied metal layer 11, and thus the backing strip 1 is not heated throughout its depth by the electric current.

The head 3 is of course caused to travel relatively to the length of the backing strip 1 in order to deposit a linear strip of the applied metal 11. If the backing strip 1 is of substantial width, parallel linear strips of metal are applied in order to cover the entire surface.

We have found that our above described process is particularly suitable for the coating or cladding of steel with nonferrous metals or alloys such as copper, brass, nickel or bronze. It is also applicable for the bonding or cladding of steel with ferrous metals or alloys such as stainless steel. The bond between the metals produced by our process is of such strength and tenacity that the resultant product can be subjected to the rigorous treatment of cold rolling (of course where the individual metals themselves can be cold rolled), in order to substantially reduce the cross-sectional thickness of the bonded layers into the form of sheets, and without disrupting the bond. Since our process is of a progressive nature, viz., applies the metal upon relatively small areas of the backing metal at a time, it is particularly suited to the coating or cladding of a backing metal having an uneven or irregular surface. Thus it is not necessary to mill the surface of the backing metal to form an accurate plane surface and to eliminate recesses or projections. Furthermore, it is not necessary to maintain the backing metal accurately and precisely in a horizontal plane, as where the applied metal is poured over a substantial amount of the surface of the backing metal.

By way of specific example, for performing our process the following directions are given for bonding a layer of bronze upon a slab of steel: The steel slab is preheated to a temperature of from 300° to 500° F. below the melting point of the bronze. The bronze in the form of $\frac{1}{16}$ inch diameter commercial bronze wire is fed through the traveling head 3 at the rate of from 12 to 15 pounds per hour; the electric heating current passed through the wires 4 and 5 is in the range of 300 to 400 amperes. The lower end or tip of the traveling head is spaced about ¾ inch from the surface of the slab 1. The oxygen and fuel gas is introduced through the conduits 7 and 8 at the rate of 8 to 10 cubit feet per hour, and with a neutral atmosphere in the flame.

In the modified form of apparatus, shown in Figs. 4 and 5, multiple gas torch heads and multiple applied metal rods are provided. The backing plate, slab or strip 21 is shown as being moved with respect to the stationary rods 22 of applied metal. The rods 22 are fed through the stationary holders or electrodes 23 and an electric current is passed through the slab 21, rods 22 and holders 23 by means of the wires 24 and 25 connected to the transformer 26. Gas torch heads 27 and 28 are mounted at an angle slightly inclined from the vertical upon each side of the area or zone where the rods 22 contact with the backing slab 21. The flames 30 impinge upon the surface of the backing metal immediately in advance of the point of application of the molten or applied metal 211, while the flames 29 maintain the applied metal in molten condition so as to give it an opportunity to flow and spread properly, creating also a mild puddling of the applied metal, which is desirable. The torch heads 27 and 28 are similarly cooled, as in the case of the head 3, by means of the cooling water inlet and outlet pipes 212 and 213. As will be noted from Fig. 4, the gas entrained flux is supplied to the torch heads 27 and 28 in the same manner as previously described in connection with Fig. 1.

This application is a continuation of our co-pending application, Serial No. 228,368, filed September 3, 1938.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. In a method of cladding metals, the steps which consist in providing a backing metal and a metal to be applied thereto, providing a combustible gas flame having a vaporizing flux entrained therein, directing said flame and flux against the surface of the backing metal while moving said flame and backing metal relatively to each other, whereby to progressively clean by increments substantially the entire surface of said backing metal of all impurities which would interfere with the creation of a sound bond between the backing and applied metals, and flowing said metal to be applied onto said backing metal in such manner as to cause said applied metal to cover each increment of said cleaned surface after such increment has been cleaned.

2. In a method of cladding metals, the steps which consist in providing a backing metal and a metal to be applied thereto, flowing said metal to be applied onto said backing metal in a molten condition, moving one of said metals relatively to the other whereby substantially the entire area of the backing metal is coated with the other metal and, during said movement, directing a combustible gas flame having a vaporized flux entrained therein against the surface of the backing metal in advance of the point of application of the molten metal to thoroughly clean said surface of all impurities which would interfere with the creation of a sound bond between the backing and applied metals, and the speed of movement of one metal relatively to the other and the temperature of the molten and applied metals being so proportioned as to produce a substantial thickness of coating of the applied metal.

3. In a method of cladding metals, the steps which consist in providing a backing metal and a metal to be applied thereto, heating said backing metal, providing a combustible gas flame having a vaporized flux entrained therein, directing said flame and flux against the surface of the backing metal while moving said flame and backing metal relatively to each other, whereby to progressively clean by increments substantially the entire surface of said backing metal of all impurities which would interfere with the creation of a sound bond between the backing and applied metals, and flowing said metal to be applied onto said backing metal in such manner as to cause said applied metal to cover each increment of said cleaned surfaces after such increment has been cleaned.

MENAHEM MERLUB-SOBEL.
CHARLES A. MEDSKER.